June 25, 1929.  L. FEJES ET AL  1,718,282
MEDICAL SERUM
Filed Feb. 16, 1927
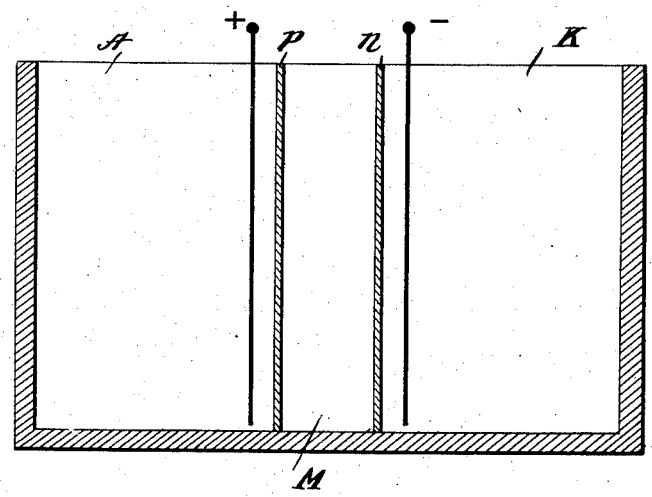
Inventor
Ludwig Fejes
Bruno Böttcher
By Edward C. Sasnett
Attorney Patented June 25, 1929.

1,718,282

UNITED STATES PATENT OFFICE.

LUDWIG FEJES AND BRUNO BÖTTCHER, OF BERLIN, GERMANY, ASSIGNORS TO THE FIRM ELEKTRO-OSMOSE AKTIENGESELLSCHAFT (GRAF SCHWERIN GESELLSCHAFT), OF BERLIN, GERMANY.

MEDICAL SERUM.

Application filed February 16, 1927. Serial No. 168,806.

This invention refers broadly to improvements in medical sera, and the object of the invention is a serum of higher purity than obtainable heretofore and the administration of which is free from the noxious actions frequently accompanying the administration of the products heretofore in use. The invention is based upon the utilization of the immune serum obtained from correspondingly treated animals and purified by means of an electro-osmotic procedure, such as is for instance described in the copending application, 14,776 for U. S. patent, filed by Wilhelm Ruppel. By means of this electro-osmotic method of purification a product is obtained which is of a higher degree of purity than obtainable heretofore. In accordance with the previous art it was the object to remove from the so-called native or crude sera furnished by the immunized animal system, all those substances which are not conducive to the medical or curative effect proper. These components generally designated as "ballast"-substances contain fractions of protein, which, while being free from injurious properties themselves, fail to contain immune substances and by their presence produce an objectionable increase of the total contents of protein of the serum. Of these protein fractions the albumin-bodies should be particularly noted, and of a similar nature, as regards the purposes of this invention, are the decomposition products contained in every serum, the amino-acids, the invariably present lipoids, coloring matter, purin bases and the like.

On the other hand however, and in contradistinction therefrom the globulines contained in the serum cannot be regarded the equivalent of the ballast substances referred to. In accordance with the present state of the art it has been generally admitted that the most prominent constituents of these bodies, that is to say the pseudo-globulines, represent the carriers of the actual curative medicinal substances of the specific sera. In the case of the diphtheria-curative-serum which is the serum most easily accessible to investigation it can be readily ascertained that more than 90% of the antitoxine-units contained in the finished serum are incorporated in this fraction of the serum and the same holds true of all the other antitoxic and antibacterial immune sera.

The most undesirable component is the second globuline fraction, the so-called euglobuline. The euglobulines, while containing all those antitoxine or immune bodies which, aside from those incorporated with the pseudoglobuline are to be found in the serum, are the specific carriers of all those bodies which are the cause of the objectionable, undesirable, and even injurious properties of the curative sera. In the euglobuline fraction those substances are met with which cause anaphylaxia upon repeated injection and the so-called serum-disease. In the euglobulines the antigen-residues will moreover remain, that is to say, parts of the poisons employed for the immunization of the blood-furnishing horses against the action of which the animal system is unable to produce any anti-poisons. The majority of practitioners attribute to the presence of such poisonous bodies the appearance of certain secondary diseases, such as paralysis of accommodation, and paralysis of the gums after recovery from diphtheria. Furthermore, the presence of the euglobulines is the cause of the weakening of the curative sera. By the action of the euglobulines present autolytic processes are produced in the serum in the course of time which are always accompanied by the decomposition of the valuable serum-components, and of the pseudoglobulines in particular above referred to, so as to result in the destruction of the immunizing bodies.

All purification processes disclosed by the previous art and comprising in their essential features the salting out of the globulines with subsequent dialysis are objectionable for the reason that by such methods a separation of the globuline-fraction into pseudo-globulines and euglobulines cannot be obtained, so that the elimination of the fraction last mentioned is not possible thereby.

Only by the process of electro-osmosis, and particularly by the method hereinbefore referred to, and set forth in copending application 14,776 of Wilhelm Ruppel it has become possible to arrive at a substantially quantitative splitting up of the globuline mixtures into the components, pseudoglobulines and euglobulines, so that the latter may be entirely removed thereby.

On the accompanying drawings we have shown by way of example and merely diagrammatically in vertical section an apparatus in which the process of purification of the product, forming the subject of our invention, may be performed.

In the drawing:—A indicates the anode chamber, K the cathode chamber, p and n are respectively the positive diaphragm and the negative diaphragm which are spatially disposed, so as to constitute a central chamber M between them. The anodic diaphragm preferably consists of vegetable material, canvas or the like, while the cathodic diaphragm comprises an animal membrane, gelatine or the equivalent thereof. The raw material, blood serum, exudates or transudates is introduced into the central chamber and is submitted to the action of the direct current. By this means all the electrolytes are withdrawn, and at the isoelectric point (corresponding to a hydrogen-ion value of 6.4 $P_H$) the insoluble euglobulin is separated out which carries down all the antigens and the disease germs originally contained in the crude, native liquids. The deposit, the euglobuline, is then separated by filtration, centrifugation or otherwise from the liquid which contains the pseudoglobulines and the albumines. By the well known addition of salt these two bodies are separated. The precipitate obtained and consisting of pseudoglobulines is dissolved in water, and is again subjected to the action of the electric current in the three-cell-electro-osmotic apparatus mentioned, and by this means a perfectly clear liquid is obtained which substantially contains merely pseudoglobulines and the specific immunizing substances incorporated therewith in large quantities. This liquid may be concentrated in vacuo, while avoiding high temperatures, preferably at 31 degrees centrigrade; or the liquid may be evaporated to dryness.

The purification may also be carried out by eliminating the alumbine and the bulk of the electrolytes and of the ballast substances, blood salts, carbon-hydrates, nitrogenous organic substances, amino-acids and peptones by salting out and filtration. The precipitate which contains mainly globulines and precipitants, is preferably dissolved in a small amount of water, is treated with barium-acetate for the removal of sulphuric acid and sulphates, and is filtered off from the barium-sulphate. The clear globuline solution obtained is then treated in the three-cell-apparatus in the manner described by electro-osmosis, and the albuminous and proteid bodies which have become flocculated out from the liquid at the isoelectric point of the euglobuline, corresponding to a hydrogen-ion value of 6.4 $P_H$ are separated by centrifugation or otherwise from the clear liquid which is free from electrolytes.

According to another method a purely osmotic procedure may be employed for the fractionization and purification of the serum by separating the lyophilous pseudoglobuline which does not decompose in the absence of electrolytes in a weakly alkaline solution from the albumines. In this case an indifferent or weakly positive anodic "migrating"-diaphragm may be inserted between the vegetable and animal membranes, causing the albumines to be discharged as the anion while the globuline remains in the cathodic chamber and is separated into pseudoglobuline and euglobuline.

*Examples.*—Ten liters diphtheria-serum are diluted with about half as much water and are treated with about the same quantity of saturated solution of ammonium-sulphate. After allowing to stand 6 to 10 hours the salted out globuline is sufficiently agglomerated to allow of being filtered by hardened filters quantitatively. The residue is removed from the filters and is dissolved in a small amount of water. The amount of ammonium sulphate is determined by titration of a small amount of the solution, after coagulation by boiling, with barium-acetate, then barium-acetate is added, the insoluble barium sulphate is filtered off or removed by centrifugation. The clear solution contains the globulines and small residues of blood salts and ammonium-acetate and albumine decomposition products. It is treated in the apparatus described at a current intensity of 10–15 ampere and at 20–30 volts. After a few hours the current strength drops down to 0.2—0.5 amps., while the voltage rises to 200 to 220 volts. At a hydrogen concentration of about 6.4 $P_H$ a maximum of a flocculent precipitate is formed, consisting of euglobuline which is separated off by centrifugation, while the pseudoglobuline which is free from electrolytes may be decanted off.

This pseudoglobuline which is free from electrolytes constitutes in a faintly alkaline solution (7.4 $P_H$) with isotonic salt-contents (0.85% NaCl) a more or less concentrated product as compared with the original globuline solution as regards the antitoxine-units. From 80 to 90 per cent of the original units are recovered, while 10–20% are separated off with the euglobuline.

| | |
|---|---|
| Total proteids | 8.52% |
| Albumine | 1.93% |
| Globuline | 6.59% =4.60% pseudoglobuline+1.98% euglobuline |
| Pseudoglobuline-solution | 11.02% |
| Yield of antitoxine-units | 90% |
| Concentration factor | 1.38% |

A chemical test shows the total absence of all inorganic and organic accompanying substances of the original serum, such as chlorides, phosphates, carbonates, sulphates, phosphatids, cholesterin, carbon-hydrates, ammonia, urea, uric acid, creatine, creatinine, and the like, of amino-acids, peptones, albumoses, coloring matter and of albumine and euglobuline.

*Example with pneumococci serum.*—This serum is treated in the same manner, the final product showing the following characteristics:—

| | |
|---|---|
| Total proteids | 7.57% |
| Albumin | 1.17% |
| Globuline | 6.4% = 4.7% pseudoglobuline + 1.7% euglobuline |
| Pseudoglobuline solution | 9.69% |
| Yield | 85% |
| Concentration factor | 1.8% |

The chemical test shows complete absence of all other substances except pseudoglobuline.

The pseudoglobuline thus obtained is particularly distinguished by the following properties as compared with the original serum:—

It constitutes a colorless liquid, even at high protein-concentrations which does not undergo any further changes in regard to its colloidal distribution and accordingly in regard to its valuation, inasmuch as the labile euglobuline with the antigen residues, the lipoids, and the like cannot exercise any further action by impairing the degree of dispersion, and by producing the otherwise resulting weakening of the sera. The viscosity of the pure globuline has been greatly reduced by the same reasons, and the absorbing qualities are correspondingly increased. This very thorough purification of the pseudoglobuline can only be effected by the electro-osmotic method (electro-dyalitic fractionization), by means of which only lyophilous albumine + pseudoglobulines or pseudoglobuline and lyophobous euglobuline and antigen-residues will remain. The perfect separation of the two final fractions is characterized by a maximum of albuminous flocculation at the iso-electric point of the euglobulin (6.4 $P_H$).

The pseudoglobulines obtained in this manner containing the totality of the desired protective or curative bodies in a pure condition exhibit the same curative and protective effects as the original serum, but they are free from the drawbacks thereof, and are therefore greatly superior to such sera in various respects. The specific pseudoglobuline-solutions thus obtained do not cause any serum disease and do not produce anaphylaxia even upon repeated administration. They are superior by their permanent keeping qualities, and they do not lose their curative effects. In view of all these facts their action is much quicker even in subcutaneous injection; nor do these injections produce pain or local irritative reactions at the point of injection. Particularly in the case of the manufacture of highly concentrated immune sera the relatively low contents of albuminous matter and the low degree of viscosity constitute a very important progress in the particular art. The specific pseudoglobulines obtained in the manner described by the electro-osmotic method represent the efficient principle, that is to say, the protective or curative substance of the complete serum in the pure condition, and they are particularly distinguished by the fact that they are free from other nitrogenous, and other inactive constituents of the serum.

The invention is, of course, not to be restricted to the particular features and steps, herein described and specified by way of exemplification, but it is susceptible of modifications, except as will otherwise appear from the appended claims.

We claim:—

1. The method of purifying animal protective and curative sera, which consists in treating such sera with a salt, thereby salting out and precipitating the globulines, dissolving the precipitate in water, removing the remaining precipitant therefrom, then submitting the remaining globuline-solution to electro-osmosis, and continuing the treatment, until at the isoelectric point the euglobuline has become deposited, and separating said deposit from the pseudo-globuline.

2. The method of purifying animal protective and curative sera, which consists in treating such sera with an excess of a sulphate, thereby salting out and precipitating the globulines, treating said precipitate with water and with barium-acetate, thereby precipitating barium-sulphate, separating the barium sulphate from the globuline-solution, and submitting said solution to electro-osmosis, and continuing the treatment, until at the isoelectric point of 6.4 $P_H$ concentration of hydrogen-ions the euglobulines have become deposited, and separating said deposit from the aqueous solution of pseudoglobuline.

3. As a new product, a diphtheria-serum comprising substantially electro-osmotic pseudoglobulines and diphtheria immunizing bodies incorporated therewith, and substantially free from electrolytes and from albumin, and substantially incapable of flocculation at the iso-electric point of the globulines.

LUDWIG FEJES.
DR. BRUNO BÖTTCHER.